United States Patent Office 3,120,840
Patented Feb. 11, 1964

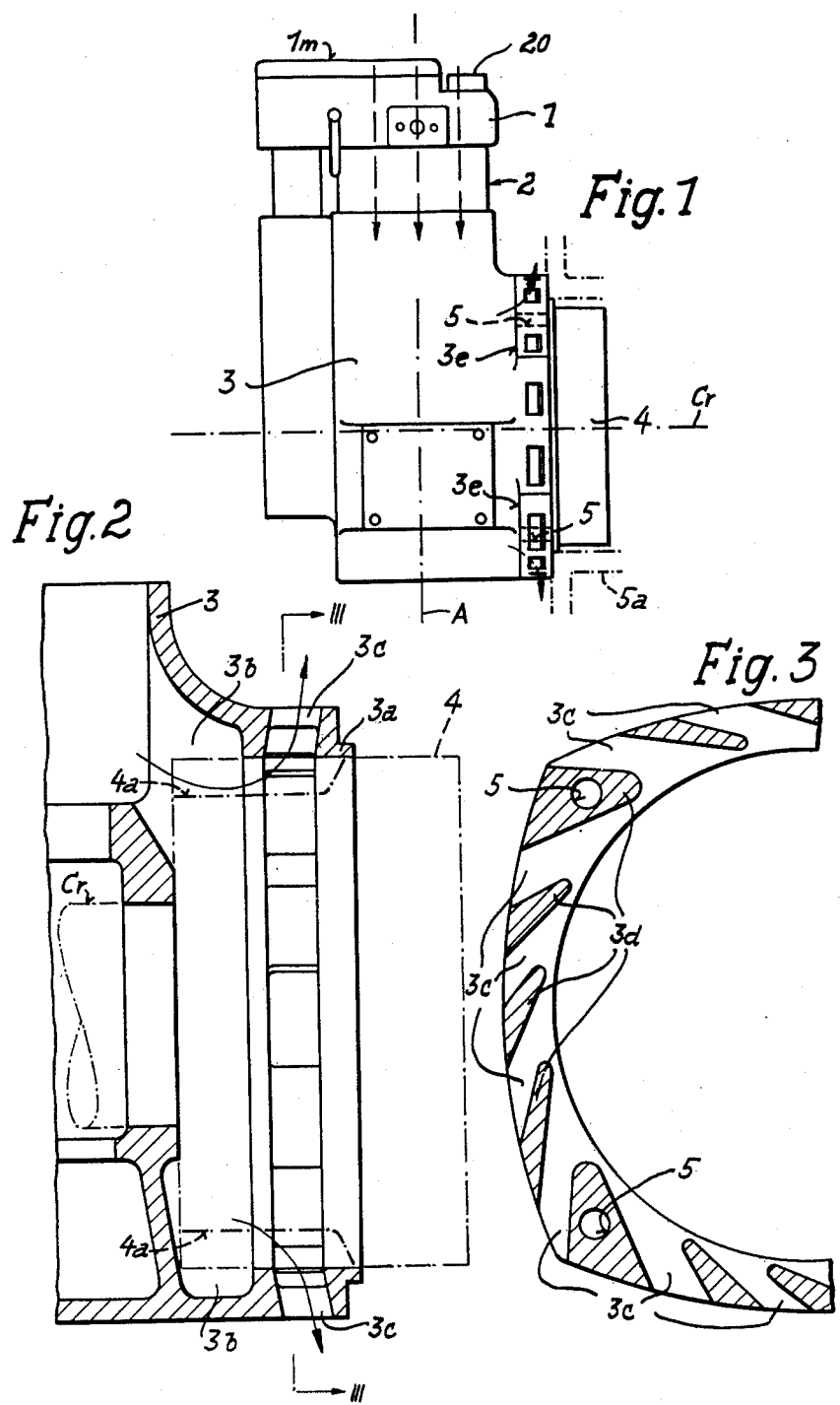

3,120,840
INTERNAL COMBUSTION ENGINES
Ernst Hatz, Ruhstorf, near Passau, Germany, assignor to Motorenfabrik Hatz, Gesellschaft mit beschränkter Haftung, Ruhstorf, near Passau, Germany, a company of Germany
Filed Apr. 5, 1961, Ser. No. 100,838
3 Claims. (Cl. 123—41.66)

The present invention relates to air cooled internal combustion engines, and has reference more particularly, though not exclusively, to diesel engines of the injection combustion type wherein the casing is primarily composed of three parts, namely a cylinder head, a cylinder block including a cylinder or cylinders and a crank case.

An object of the invention is to improve the cooling system of an internal combustion engine of this type, by advantageous exploitation of a known cooling fin system co-operating with a blower, so that there is an optimum and efficient cooling even with unfavourable installation conditions.

It is a further object of the invention to provide a novel method of connecting together the individual parts of the casing so that, despite severe heat stresses, these parts can be made of light metal and connected by fastening means of steel.

A still further object of the invention is to simplify and to improve the mounting of the complete engine, for example on a tractor.

These and further features are hereinafter described in more detail, in relation to one example of the invention.

Figure 4:
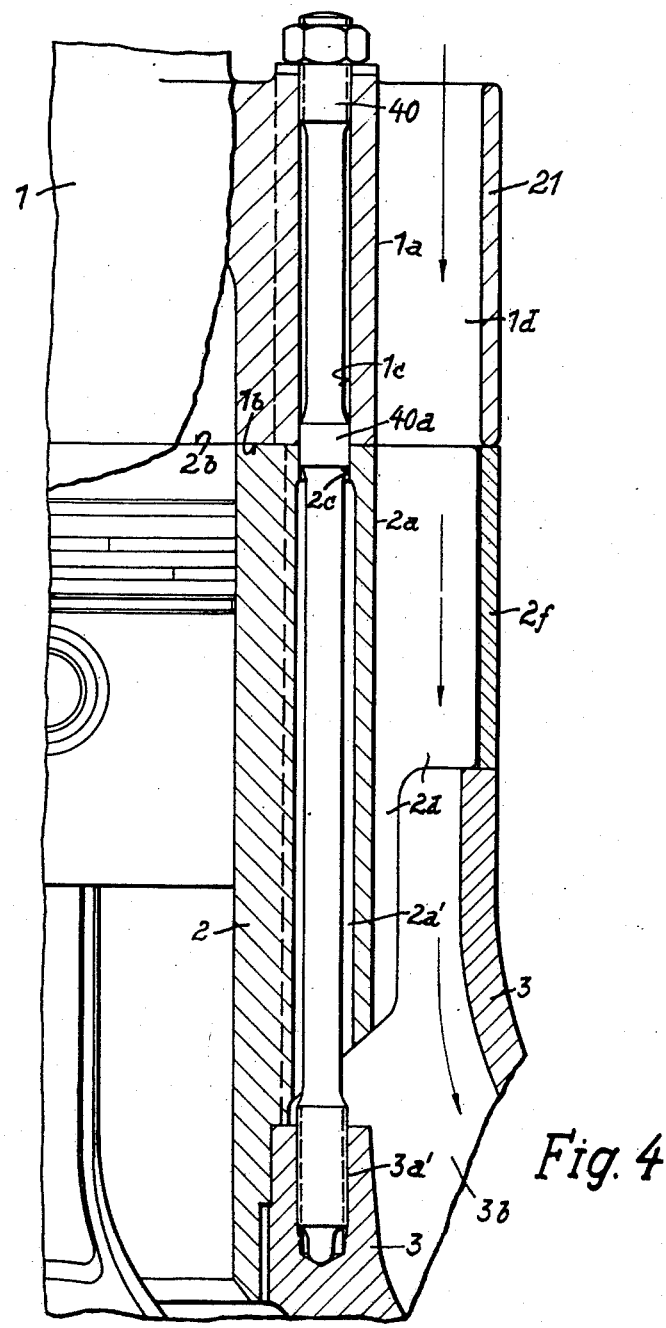
Figures 5, 6:
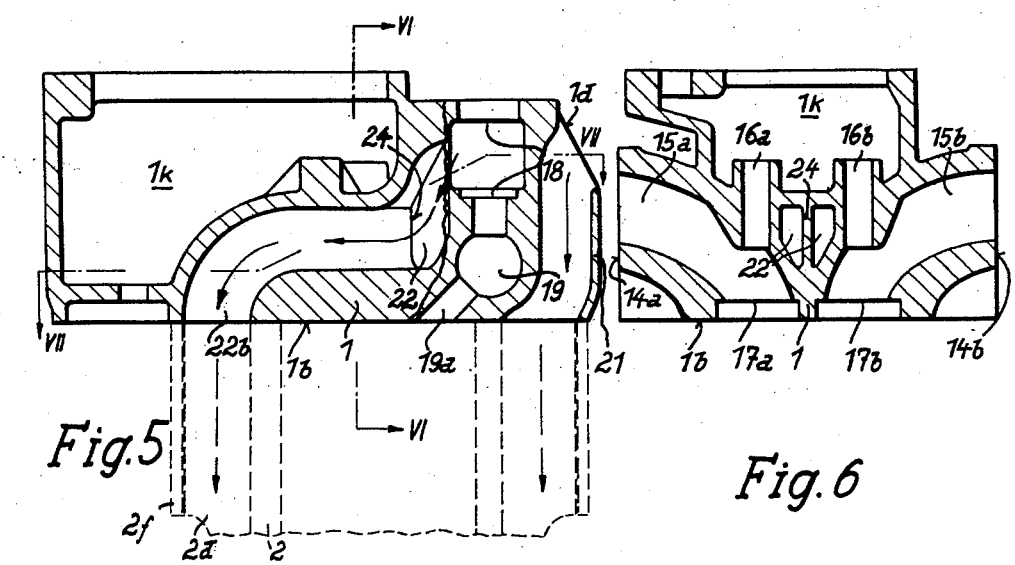
Figure 7:
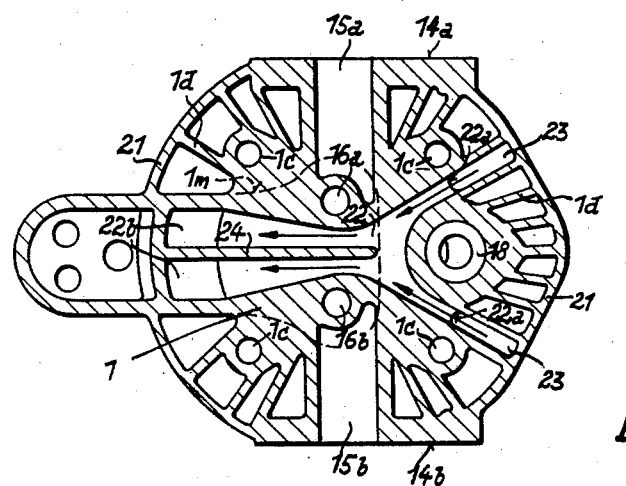

In the accompanying drawings:

FIGURE 1 is a side view of a complete engine constructed in accordance with this invention, FIGURE 2 is a vertical longitudinal section through the blower for the cooling air, FIGURE 3 is a cross section on the line III—III of FIGURE 2, FIGURE 4 is a vertical section through the parts of the engine casing, one of the fastening screws for securing these parts together being shown, FIGURE 5 is a vertical longitudinal section of the cylinder head, FIGURE 6 is likewise a vertical section through the cylinder head, but taken on the line VI—VI of FIGURE 5, and FIGURE 7 is a horizontal cross section through the cylinder head on the line VII—VII of FIGURE 5.

The illustrated internal combustion engine consists, in a known fashion, of a cylinder head 1, a cylinder 2 and a crank case 3 (FIGURE 1). These parts are connected together by means of fastening screws 40—one of which is seen in FIGURE 4. A fly wheel 4 is secured to the projecting end of the crankshaft Cr, this being formed as the rotor of a suction fan, and having the parts 4a of its periphery which forms the fan blades projecting into the receiving or centering flange 3a of the case 3 (FIGURE 2). The cooling air is, as indicated by arrows in FIGURES 1 and 2, drawn off above the cylinder head 1, is conducted through channels within or at the periphery of the parts 1, 2 and 3, into the working chamber 3b of the crank-case 3, and is expelled through the fan blades 4a on the fly wheel 4 through the openings 3c to atmosphere.

The openings 3c (FIGURE 3) are constituted by a plurality of diffuser channels which conduct the cooling air to atmosphere after leaving the fan rotor. The channels 3c are defined by blade-like intermediate walls 3d in the part 3, these blades extending approximately tangentially to the medial axial opening of the flange 3a. These intermediate walls are of such thick cross section that they may alone form the single bearing connection between the receiving or centering flange 3a and the housing 3. As a result only a small space is required around the fly wheel 4, and this is of particular advantage in compact construction, for example of small tractors. Moreover, the features provided by this invention afford a very simple shape of housing and this is of particular importance with regard to manufacture by casting.

Some of the intermediate walls 3d are made of somewhat thicker cross section than the others, so that an axial bore 5 can pass through these walls and open at one end to atmosphere in the flange 3a, and at the other end behind flange ears 3e of the housing 3. In assembly these bores 5 of the housing 3 are slipped over threaded stay bolts on an equipment carrier (not shown), for example a tractor chassis 5a, and secured to the equipment carrier by threaded nuts which are screwed on to these stay bolts and bear against the flange ears 3e.

The crown-like arrangement of the channels and intermediate walls around the wheel of the fan also achieves such constructional rigidity, that the intermediate walls 3d, in conjunction with the threaded stay bolts, not only securely carry the complete internal combustion engine on the equipment carrier, even under very heavy inertia stresses and vibrations, but in addition are so stable that auxiliary items, e.g. external bearings, axle blocks or the like can, if necessary, be flanged on to the housing of the internal combustion engine.

It has already been indicated above that the channels or intermediate walls of the diffuser-like outlet system can be manufactured by casting, so that the parts 3a, 3d and 3 may be in one cast piece, for example of light metal. Modern casting technique will guarantee that the calculated cross-sections, angles and degree of surface quality will also be achieved in the mass production of the cast parts, so that any subsequent finishing of these parts is unnecessary. Thus, the construction of this fan in accordance with the present invention requires no additional finishing outlay. Moreover, the otherwise customary and essential fan helix is also dispensed with.

The crank case 3, the cylinder 2, and a cylinder head 1 are all made of material possessing a high thermal expansion coefficient, e.g. a light metal of any appropriate known type. The said parts are connected by means of fixing screws or stay bolts 40 (FIGURE 4) which are made of material possessing a low thermal expansion coefficient, e.g. steel. Each fixing screw 40, the end of which is screw-threaded and screwed into a corresponding tapped hole 3a' formed in the crank case 3, extends through aligned holes in flanges 1a, 2a provided on the circumferential portions of the cylinder and cylinder head.

The axial dimensions of the flanges 1a, 2a are such that the fixing screws 40 are almost fully enclosed and isolated from the cylinder and cylinder head. In addition to the contacting points between the opposite ends of such fixing screws 40 and the parts 1 and 3, a further contacting point is provided by a cylindrical shoulder 40a of the fixing screw 40. In this way each fixing screw 40 is isolated from the indefinable influence of the external temperature (air or other cooling current) and is subjected to the calculable temperature of the casing parts 1 and 2 during operation of the engine. The shank of each fixing screw 40 is sufficiently reduced in diameter between its shoulder 40a and screw-threaded opposite ends as to be able to attain, within the scope of the requisite tensile strength, a greater expansion elasticity of the screw to compensate for the greater expansion of the light metal parts.

By adopting the arrangement just described all the principal factors which influence the thermal expansion of the parts (operating temperature, thermal expansion coefficient, cross-section etc.) are already determined in advance or can be exactly calculated and governed. Consequently, any expansions of the light metal parts and steel screws which may occur during operation of the engine can be mutually adapted to such an extent that such expansions can be absolutely controlled, thus avoiding undesirable distortions as well as service interruptions. In this way a cylinder of light metal can be used without any difficulty.

FIGURE 4 also shows that the bore in the cylinder body 2a to receive the fixing screw 40 is for the most part designed as a cast clearance hole 2a', so that only that portion of the bore which co-operates with shoulder 40a requires to be processed. Although this cast hole 2a' is open towards the crank case 3, it has no disadvantageous effect on the transfer of heat between the casing and the fixing screw. The cooling air flows in the direction of the arrow indicated in FIGURE 4 so that the quantity of air trapped in the cast hole 2a' does not flow but remains in this hole, is heated by the cylinder 2 and supports the flow of heat to the fixing screw.

Moreover, FIGURE 4 shows that the adjoining cylinder head 1 and cylinder 2 are provided with plane and level supporting surfaces 1b, 2b which can be processed easily with the requisite degree of accuracy. The centering of part 1 with respect to part 2, and consequently also to the cylinder A, is effected by means of co-axial centering borings 1c and 2c of the cylinder 2 and cylinder head 1 which receive and co-operate with the shoulder 40a of fixing screw 40 designed in this case to constitute a centering mandril. The fact that borings 1c and 2c lie within the opposed surfaces 1b and 2b, is worthy of mention. This has the special advantage of permitting the supporting surfaces of sealing surfaces to extend beyond the fixing screw thus increasing the transfer of heat, and decreasing or even completely avoiding the shearing stress placed on the fixing flanges by the fixing screws. Cooling ribs or fins 1d, 2d provided on the parts 1 and 2 extend parallel to the vertical axis A.

As depicted in FIGURES 5, 6 and 7, the cylinder head 1 consists of a light metal casting of almost ring-shaped cross-section. The lower part 1b of this casting is faced so that it can rest on a corresponding counter face 2b of the cylinder 2. A plurality of the fixing screws 40 which pass through bores 1c interconnect the two parts 1 and 2. The inlet and exhaust lines are connected to flanges 14a and 14b of the head 1. The inlet and exhaust channels in the head itself are designated 15a and 15b respectively. The valve stems extend into guides 16a, 16b and the heads of the valves rest on valve seats which are pressed into countersunk recesses 17a, 17b. The chamber 1K (FIGURE 5) which surrounds the known parts for operating and controlling the valves is closed at the top by a cover 1m—shown in FIGURE 1 and the outline of which is indicated in dotted lines in FIGURE 7. A graduated bore 18, terminating in a spherical pre-chamber 19 communicating with the operating chamber of the cylinder 2 at 19a, is provided for the injection nozzle 20 (FIGURE 1).

On the circumference of the cylinder head 1 are cast vertically disposed cooling ribs 1d which, in order to increase the cooling surface and the cooling effected, have their tops or outer edges connected by means of a thin circumferentially extending web of sheath 21. The longitudinal cooling ribs 1d and also the web or sheath 21 rest, with face surface 1b, on corresponding counter supports of the cylinder 2.

In order to enhance the cooling effect and also to enable a cylinder head of the form just described to be adopted in larged engines, a channel 22 is formed in and extends diametrally through the interior of the cylinder head 1. The channel 22 is defined in part by internal walls which are subject to great thermal stress in the vicinity of the valve guides 16a, 16b and the bore 18 for the injection nozzle. Two branches 22a of this channel 22 partially embrace the nozzle bore 18 and communicate with the open air at 23 (see FIGURE 7). In the interior of the head 1, channel 22 is divided into two partial channels by a longitudinal rib 24 in order to obtain an optimum cooling current, and to provide the best possible cooling effect by enlarging the cooling surface. The channel 22, extending approximately horizontally in this area, then curves downwardly and terminates in two openings 22b on the underside of the cylinder head 1. These openings are connected to one channel between the two cooling ribs 2b on the periphery of the cylinder 2 and with chamber 3b of the cooling air blower or pump system 3c, 4, 4a of the combustion engine. Thus, fresh air will continuously flow through channel 22 in the direction indicated by the arrows in FIGURES 1, 4, 5 and 6, consequently cooling in a very favourable manner the critical thermal points between the two valves and the injection nozzle.

By combining the external cooling rib arrangement with the internal channel cooling just described, a cylinder head cooling system is provided which adequately meets the requirements of a large-size engine. As such an internal channel can, without difficulty, be formed during the casting of a cylinder head, no special operations are necessary when the head is being machined.

In the internal combustion engine described, the cooling air is drawn by the blower 4 over the cylinder head 1, and then passes over the plurality of cooling ribs or fins 1d through the cylinder head 1 and downwards to the cylinder 2. Here it again flows downwards between the various cooling ribs or fins 2d to the periphery of the cylinder 2, the cooling ribs or fins 2d being surrounded externally by a special, separate cover annulus 2f, and finally passes down into the suction chamber 3b of the cooling air blower 4, 4a whence it is blown to atmosphere through the openings 3c. In addition to this cooling rib or fin system, cooling fresh air is drawn in from above through the additional cooling channel 22, substantially transversely to the cylinder axis, and then conducted into one or two channels which are defined at the periphery of the cylinder 2 between the cooling fins 2d and the annulus 2f (seen in dotted lines in FIGURE 5). From here it passes downwards again into the chamber 3b to the remaining used cooling air and is blown out through the blower 4, 4a.

The disadvantages of known constructions which lie in the limitation of the constructional adaptability, is overcome in the present invention by the fact that, in addition to a suction cooling system having axially parallel cooling ribs or fins, a cooling channel passes through the cylinder head and is connected at one end to the suction side of a blower. There is thus no limitation on the disposition of the main and additional cooling means and this can consequently be used under all operating conditions.

The additional cold air will, as a consequence of the hereinbefore described linear disposition of the special cooling channel enter the cylinder head at the part thereof which is subjected to the maximum heat. Moreover, this cold air will be conducted out of the cylinder head and correspondingly heated at that part which is subject to a minimum thermal stress, and will therefrom pass into the further suction blower conduction system of the engine. Thus, at all times the hot parts of the cylinder head will be traversed by cool air and the less hot parts with air which has been warmed up, thus producing, in practice, a uniform cooling effect over the whole extent of the head.

The construction of an internal combustion engine according to the present invention is also such that the engine casing and the blower housing constitute two portions of one part, preferably a light metal casting, which is adapted to be movably mounted, by means of a mounting flange, on an engine support, for example a chassis, the intermediate walls of the blower housing forming the only supporting connection between the engine housing and the mounting flange.

In this way, a stability is achieved without additional means in the construction so that not only the whole internal combustion engine can be safely mounted on the engine support even with the strongest inertia forces and vibration, but the construction is so rigid that, if desired, additional apparatus, for example external bearings, axis supports or the like, can be flange-mounted on the engine casing.

Again, in the improved arrangement provided by the invention, the factors, including operating temperature, influencing expansion of the parts in an air-cooled internal combustion engine are fixed in advance in the same way as in a water-cooled internal combustion engine, and are accurately calculable and controllable. The expansion which occurs during operation between the parts in question is so balanced by the additional thermal protection of the fixing screws and brought under control that undesired stresses are avoided and breakages and any other interruptions in operation resulting from these are prevented. These indispensable conditions for the use of a light metal cylinder in an air-cooled internal combustion engine of large dimensions and high thermal stresses can be readily and economically achieved by the adoption of the improvements provided by the present invention.

I claim:

1. In an air cooled internal combustion engine the improvement comprising, in combination, a cylinder, a cylinder head surrounding said cylinder, and means for positively drawing cooled air through the engine and into an exhaust duct, said cylinder and cylinder head having external cooling passages defined by cooling ribs extending from the cylinder and shrouded by an annulus, and at least one internal cooling channel extending through the cylinder head and defined in part by walls subject to great thermal stress in the cylinder head, said channel communicating at an end thereof with one of said cooling passages, whereby cooling air drawn through said internal cooling channel is confined thereto and contacts said walls having high thermal stresses and is thereafter confined to one cooling passage on said cylinder, while the cooling air which contacts said external shrouded cooling fins on said cylinder head is conducted down the remainder of said cooling passages so as to cool the cylinder and then is conducted to said exhaust duct.

2. A combination according to claim 1 wherein the portions of said head having high thermal stresses are valve guides and a precombustion chamber.

3. A combination according to claim 1 wherein the cooling channel is provided with at least one longitudinal rib serving to divide it into two partial channels.

References Cited in the file of this patent

UNITED STATES PATENTS

| | | |
|---|---|---|
| 835,277 | Frayer et al. | Nov. 6, 1906 |
| 1,012,635 | Harmer | Dec. 26, 1911 |
| 1,323,010 | Burtnett | Nov. 25, 1919 |
| 1,491,584 | Connor | Apr. 22, 1924 |
| 2,393,899 | Gregory | Jan. 29, 1946 |
| 2,478,106 | Jozif | Aug. 2, 1949 |
| 2,573,116 | Stuckert | Oct. 30, 1951 |
| 2,584,289 | Rabe | Feb. 5, 1952 |
| 2,851,020 | Dolza | Sept. 9, 1958 |
| 2,996,050 | Caris | Aug. 15, 1961 |

FOREIGN PATENTS

| | | |
|---|---|---|
| 519,626 | France | Jan. 27, 1921 |
| 984,201 | France | Feb. 21, 1951 |
| 989,722 | France | May 30, 1951 |
| 1,197,813 | France | June 8, 1959 |
| 124,099 | Great Britain | Mar. 20, 1919 |